US010433571B2

(12) United States Patent
Segall et al.

(10) Patent No.: US 10,433,571 B2
(45) Date of Patent: Oct. 8, 2019

(54) PREPARATION OF SOY PROTEIN PRODUCTS ("S810")

(71) Applicant: Burcon NutraScience (MB) Corp., Winnipeg (CA)

(72) Inventors: Kevin I. Segall, Winnipeg (CA); Martin Schweizer, Winnipeg (CA); Brent E. Green, Warren (CA)

(73) Assignee: Burcon NutraScience (MB) Corp.

( * ) Notice: Subject to any disclaimer, the term of this patent is extended or adjusted under 35 U.S.C. 154(b) by 0 days.

(21) Appl. No.: 14/836,864

(22) Filed: Aug. 26, 2015

(65) Prior Publication Data

US 2016/0058031 A1    Mar. 3, 2016

Related U.S. Application Data (60) Provisional application No. 62/042,425, filed on Aug. 27, 2014.

(51) Int. Cl.
*A23J 1/14* (2006.01)
*A23L 2/66* (2006.01)
*A23L 33/185* (2016.01)

(52) U.S. Cl.
CPC . *A23J 1/14* (2013.01); *A23L 2/66* (2013.01); *A23L 33/185* (2016.08)

(58) Field of Classification Search
CPC .............. A23J 1/14; A23L 1/3055; A23L 2/66
See application file for complete search history.

(56) References Cited

U.S. PATENT DOCUMENTS 3,966,702 A    6/1976 Carey
4,169,090 A    9/1979 Murray et al.
(Continued)

FOREIGN PATENT DOCUMENTS

WO    2005107492 A1    11/2005
WO    2010045727 A1    4/2010
WO    2010083612 A1    7/2010

OTHER PUBLICATIONS

Anderson, R.L. et al., "Compositional changes in trypsin inhibitors, phytic acid, saponins and isoflavones related to soybean processing," J. Nutr., 1995, pp. 581S-588S, 125(3 Suppl), American Society for Nutrition.
(Continued)

*Primary Examiner* — Elizabeth Gwartney (57) ABSTRACT

The present invention is directed to soy protein products, very low in, or free of, beany flavor notes and useful for the fortification of food and beverage products and prepared without the use of salt in the process. The soy protein products of the present invention are obtained by extracting soy protein source with water to form an aqueous soy protein solution, at least partially separating the aqueous soy protein solution from residual soy protein source, adjusting the pH of the aqueous soy protein solution to a pH of about 1.5 to about 3.6 to solubilize at least a portion of the protein and form an acidified soy protein solution then separating the acidified soy protein solution from the acid insoluble solid material. The acidified soy protein solution may be dried following optional concentration and diafiltration to form a soy protein product, which may be an isolate. The acid insoluble solid material may be washed with acidified water and then dried to form another soy protein product. These products may be dried at the acidic pH at which they were prepared or may be adjusted in pH before drying.

4 Claims, 1 Drawing Sheet

(56) References Cited

U.S. PATENT DOCUMENTS

| | | | |
|---|---|---|---|
| 4,208,323 A | 6/1980 | Murray et al. | |
| 4,296,026 A | 10/1981 | Millar | |
| 4,307,014 A | 12/1981 | Millar | |
| 4,366,097 A | 12/1982 | Cameron et al. | |
| 4,418,013 A | 11/1983 | Cameron et al. | |
| 4,677,065 A | 6/1987 | Buchbjerg et al. | |
| 5,520,935 A | 5/1996 | Eriksen et al. | |
| 5,844,086 A | 12/1998 | Murray | |
| 6,005,076 A | 12/1999 | Murray | |
| 7,090,887 B2 | 8/2006 | Newkirk et al. | |
| 2005/0123649 A1 | 6/2005 | Benitez et al. | |
| 2005/0165220 A1 | 7/2005 | Barker et al. | |
| 2005/0255226 A1 | 11/2005 | Schweizer et al. | |
| 2007/0014909 A1 | 1/2007 | Mai et al. | |
| 2007/0065567 A1 | 3/2007 | Segall et al. | |
| 2008/0226810 A1 | 9/2008 | Passe et al. | |
| 2008/0280024 A1 | 11/2008 | Harle et al. | |
| 2010/0098818 A1 | 4/2010 | Schweizer et al. | |
| 2010/0203203 A1* | 8/2010 | Segall | A23J 1/14 426/330 |
| 2011/0038993 A1 | 2/2011 | Schweizer et al. | |
| 2011/0274797 A1 | 11/2011 | Segall et al. | |
| 2012/0135117 A1 | 5/2012 | Segall et al. | |
| 2013/0129901 A1 | 5/2013 | Segall et al. | |
| 2013/0189408 A1 | 7/2013 | Segall et al. | |
| 2014/0017379 A1 | 1/2014 | Segall et al. | |
| 2014/0256914 A1 | 9/2014 | Green et al. | |

OTHER PUBLICATIONS

Bacon, J.R. et al., "Preparation of transparent pea protein gels: a comparison of isolation procedures," Int. J. Food Sci. Technol., 2007, pp. 527-537, 25(5), Wiley.

Berk, Z., "Technology of Production of Edible Flours and Protein Products From Soybeans," FAO Agricultural Services Bulletin No. 97, 1992, Food and Agriculture Organization of the United Nations Rome http://www.fao.org/docrep/t0532e/t0532e00.HTM.

Boye, J. et al., "Pulse proteins: Processing, characterization, functional properties and applications in food and feed," Food. Res. Int., 2010, pp. 414-431, 43(2), Elsevier Ltd.

Chakraborty, P. et al., "Ultracentrifugation of salt-soluble proteins in ten legume species," J. Sci. Food Agric., 1979, pp. 766-771, 30(8), John Wiley & Sons, Ltd.

Damodaran, S. "Amino Acids, Peptides and Proteins," Food Chemistry, 1996, pp. 321-416, 3rd Edition, Marcel Dekker.

Doyle, J.J. et al., "The Glycosylated Seed Storage Proteins of Glycine max and Phaseolus vulgaris," J. Biol. Chem., 1986, pp. 9228-9238, 261(20), American Society of Biological Chemists, Inc.

Friedman, M. et al., "Nutritional and Health Benefits of Soy Proteins," J. Agri. Food Chem., 2001, pp. 1069-1086, 49(3), American Chemical Society.

Guillamon, E. et al., "The trypsin inhibitors present in seed of different grain legume species and cultivar," Food Chemistry, 2008, pp. 68-74, 107(1), Elsevier Ltd.

Haard, N.F. et al., Characteristics of Edible Plant Tissues, Food Chemistry, 1996, pp. 943-1011, 3rd Edition, Marcel Dekker.

Kagawa, H. et al., "Soybean basic 7 S globulin represents a protein widely distributed in legume species," FEBS Lett., 1987, pp. 145-149, 226(1), Elsevier Science Publishers B.V.

Marcone, M. "Biochemical and biophysical properties of plant storage proteins: a current understanding with emphasis on 11S seed globulins," Food Res. Int., 1999, pp. 79-92, 32(2), Elsevier Ltd.

Pedroche, J. et al., "Plant Protein Hydrolysates and Tailor-Made Foods," Electron. J. Environ. Agric. Food Chem., 2003, pp. 233-235, 2(1).

Sumner, A.K. et al., "Production and Evaluation of Pea Protein Isolate," J. Food Sci., 1981, pp. 364-366, 46(2), John Wiley and Sons.

Tomoskozi, S. et al., "Isolation and study of the functional properties of pea proteins," Nahrung/Food, 2001, pp. 399-401, 45(6), Wiley-VCH.

Vose, J.R., "Production and Functionality of Starches and Protein Isolates from Legume Seeds (Field Peas and Horsebeans)," Cereal Chem., 1980, pp. 406-410, 57(6), American Association of Cereal Chemists, Inc.

Wang, N. et al., "The Chemical Composition and Nutritive Value of Canadian Pulses," Canadian Grain Commission, Grain Research Laboratory, 2004.

Wilson, L.A. et al., "Isolation and Characterization of Starch from Mature Soybeans," Cereal Chem. 1978, pp. 661-670, 55(5), American Association of Cereal Chemists.

Wright, D.J. et al., "Legume proteins in food technology," Phil. Trans. R. Soc. Lond. B, 1984, pp. 381-393, 304 (1120), The Royal Society.

Food and Agriculture Organization of the United Nations, Joint FAO/WHO Food Standards Programme, Codex Alimentarius: Cereals, Pulses, Legumes and Vegetable Proteins, 2007, 1st Edition, Food & Agriculture Org.

"U.S. Department of Agriculture, "Composition of Foods Raw, Processed, Prepared," Agricultural Research Service, 2013, USDA National Nutrient Database for Standard Reference, Release 26. Nutrient Data Laboratory Home Page, http://www.ars.usda.gov/ba/bhnrc/ndl".

* cited by examiner

PREPARATION OF SOY PROTEIN PRODUCTS ("S810")

CROSS-REFERENCE TO RELATED APPLICATIONS

This application claims priority to U.S. Provisional Patent Application No. 62/042,425, filed Aug. 27, 2014, which is incorporated herein by reference in its entirety.

FIELD OF THE INVENTION

The present invention relates to novel and inventive soy protein products and to novel and inventive methods of preparing soybean protein products.

BACKGROUND TO THE INVENTION

In U.S. Pat. Nos. 8,563,071 and 8,691,318 and U.S. patent application Ser. No. 13/879,418 filed Aug. 1, 2013 (US Patent Publication No. 2013-0316069 published Nov. 28, 2013) ("S701"), assigned to the assignee hereof and the disclosures of which are incorporated herein by reference, there are described procedures for the preparation of protein products with excellent solubility, heat stability and clarity in low pH solutions as well as a clean flavour, without beany notes.

In U.S. patent application Ser. No. 13/924,860 filed Jun. 24, 2013 (US Patent Publication No. 2014-0010940 published Jan. 9, 2014) ("S701N2") and in U.S. patent application Ser. No. 12/975,805 filed Dec. 22, 2010 (US Patent Publication No. US 2011-0165314 published Jul. 7, 2011) and Ser. No. 13/518,217 filed Sep. 5, 2012 (US Patent Publication No. US 2012-0322980), assigned to the assignee hereof and the disclosures of which are incorporated herein by reference, there are described the provision of neutral or near neutral pH forms of the soy protein products described above. These products, with their clean taste, are useful for food compositions having a neutral or near neutral pH. Although solubility is still desirable, food applications at neutral or near neutral pH are typically not transparent and so complete solubility and clarity in water are not necessarily a requirement.

In the procedures described in the aforementioned U.S. Pat. Nos. 8,563,071 and 8,691,318 and U.S. patent application Ser. Nos. 13/879,418, 13/924,860, 12/975,805 and 13/518,217, protein extraction is effected with calcium salt solution. The calcium salt solution assists in solubilisation of protein from the protein source while separating it from phytic acid, which is precipitated and remains with the residual protein source. The protein extract solution is optionally diluted with water and adjusted in pH to about 1.5 to about 4.4 to provide a clear, acidified protein solution. While not wishing to be bound by any particular theory, it is thought that the clean flavour of the soy protein products obtained by these procedures is promoted by the low pH treatment of the sample, preferably in combination with optional subsequent membrane processing steps.

One potential concern with the procedures described in the aforementioned U.S. Pat. Nos. 8,563,071 and 8,691,318 and U.S. patent application Ser. Nos. 13/879,418, 13/924,860, 12/975,805 and 13/518,217 is the quantity of calcium salt required to effect the protein extraction step and the costs and issues of the quantity of salt entering the process as well as the recovery or disposal of calcium salts in the waste streams of the process. A reduction or elimination of calcium salt could result in significant savings in the cost of processing and production of the protein products.

SUMMARY OF THE INVENTION

The present invention relates to novel and inventive soy protein products very low in, or substantially free of, beany flavour notes, and novel and inventive processes for the preparation thereof, which processes do not include the direct addition and use of calcium salt or other salt in extraction of the protein from the protein source material or in any other process step.

Accordingly, in one aspect of the present invention, there is provided a method of producing a soy protein product having a protein content of at least about 60 wt %, preferably at least about 90 wt % (N×6.25) on a dry basis, which method comprises:

(a) extracting a soy protein source with water to cause solubilization of soy protein from the protein source and to form an aqueous soy protein solution, (b) at least partially separating the aqueous soy protein solution from the residual soy protein source, (c) adjusting the pH of the aqueous soy protein solution to a pH of about 1.5 to about 3.6 to produce an acidified soy protein solution, (d) separating the acid insoluble solid material from the acidified soy protein solution, (e) optionally concentrating the acidified soy protein solution by a selective membrane technique, (f) optionally diafiltering the optionally concentrated soy protein solution, (g) optionally drying the optionally concentrated and optionally diafiltered soy protein solution.

In an embodiment of the present invention, when prepared at a low pH, the soy protein product of the present invention is well suited for use in food applications having a low pH.

In an embodiment of the present invention, the pH of the acidified soy protein solution or the optionally concentrated and optionally diafiltered acidified soy protein solution is adjusted to less than about 8.0, prior to the optional drying step. In another embodiment of the present invention, the pH of the acidified soy protein solution or the optionally concentrated and optionally diafiltered acidified soy protein solution is adjusted to about 6.0 to about 8.0, prior to the optional drying step. In another embodiment of the present invention, the pH of the acidified soy protein solution or the optionally concentrated and optionally diafiltered acidified soy protein solution is adjusted to about 6.5 to about 7.5, prior to the optional drying step.

In an embodiment of the present invention, when the soy protein product is provided at neutral or near neutral pH, it is in a form suited for use in neutral or near-neutral food applications, such as neutral beverages or bars.

In an embodiment of the present invention, the acid insoluble solid material arising from the process of the present invention and collected as described in step (d) above is further processed to provide another soy protein product. This product may generally have lower purity and a higher level of beany flavour notes compared to the products derived from the acidified soy protein solution. However, the purity and flavour of the product derived from the acid insoluble solid material is such that it is still suitable for use in food and beverage applications.

In an embodiment of the present invention, the acid insoluble solid material is optionally dried to form a soy protein product having a protein content of at least about 60 wt % (N×6.25), on a dry weight basis.

In an embodiment of the present invention, the pH of the acid insoluble solid material is adjusted to less than about 8.0, prior to the optional drying step. In another embodiment of the present invention, the pH of the acid insoluble material is adjusted to about 6.0 to about 8.0, prior to the optional drying step. In another embodiment of the present invention, the pH of the acid insoluble material is adjusted to about 6.5 to about 7.5, prior to the optional drying step.

In an embodiment of the present invention, the acid insoluble solid material is washed by mixing with about 1 to about 20 volumes of water having a pH selected from the group consisting of about 1.5 to about 3.6 and about the same as the pH of the acid insoluble material, then is separated from the wash water prior to the optional drying step.

In an embodiment of the present invention, the pH of the washed acid insoluble material is adjusted to less than about 8.0, prior to the optional drying step. In another embodiment of the present invention, the pH of the washed acid insoluble material is adjusted to about 6.0 to about 8.0, prior to the optional drying step. In another embodiment of the present invention, the pH of the washed acid insoluble material is adjusted to about 6.5 to about 7.5, prior to the optional drying step.

In an embodiment of the present invention, the wash water is combined with the acidified soy protein solution of the separating step (d) and processed as in step (e), (f) and/or (g).

In an embodiment of the present invention, the extraction step (a) is effected at a temperature of about 1° to about 100° C. In another embodiment of the present invention, the extraction step (a) is effected at a temperature of about 15° to about 65° C. In another embodiment of the present invention, the extraction step (a) is effected at a temperature of about 50° to about 60° C.

In an embodiment of the present invention, the water used for the extraction contains a pH adjusting agent so that the extraction is conducted at a pH of about 6 to about 11. In another embodiment of the present invention, the water used for the extraction contains a pH adjusting agent so that the extraction is conducted at a pH of about 7 to about 8.5. In another embodiment of the present invention, the pH adjusting agent is sodium hydroxide, potassium hydroxide, or any other conventional food grade alkali and combinations thereof.

In an embodiment of the present invention, the water used for the extraction contains an antioxidant.

In an embodiment of the present invention, the aqueous soy protein solution arising from the separation step (b) has a protein concentration of about 5 to about 50 g/L. In another embodiment of the present invention, the aqueous soy protein solution has a protein concentration of about 10 to about 50 g/L.

In an embodiment of the present invention, following the separation step (b) and prior to the acidification step (c), the aqueous soy protein solution is treated with an adsorbent to remove colour and/or odour compounds from the aqueous protein solution.

In an embodiment of the present invention, following the separation step (b) and prior to the acidification step (c), the aqueous soy protein solution is adjusted in temperature to about 1 to about 35° C. In another embodiment, the temperature of the aqueous soy protein solution is adjusted to about 15 to about 35° C.

In an embodiment of the present invention, the pH of said aqueous soy protein solution is adjusted in the acidifying step (c) to about 2.0 to about 2.5.

In an embodiment of the present invention, the acidified aqueous protein solution following separating step (d) is subjected to a heat treatment step. In an embodiment of the present invention, the heat treatment step is effected to inactivate heat-labile anti-nutritional factors. In an embodiment of the present invention, the anti-nutritional factors are heat-labile trypsin inhibitors. In another embodiment of the present invention, the heat treatment step is effected to pasteurize the acidified aqueous protein solution.

In an embodiment of the present invention, the heat treatment is effected at a temperature of about 70° to about 160° C. for about 10 seconds to about 60 minutes. In another embodiment of the present invention, the heat treatment is effected at a temperature of about 80° to about 120° C. for about 10 seconds to about 5 minutes. In another embodiment of the present invention, the heat treatment is effected at a temperature of about 85° to about 95° C. for about 30 seconds to about 5 minutes.

In an embodiment of the present invention, the heat treated acidified soy protein solution is cooled to a temperature of about 2° to about 65° C. In another embodiment of the present invention, the heat treated acidified soy protein solution is cooled to a temperature of about 50° to about 60° C.

In an embodiment of the present invention, the acidified aqueous soy protein solution is dried to provide a soy protein product having a protein content of at least about 60 wt % (N×6.25) d.b.

In an embodiment of the present invention, the acidified aqueous soy protein solution is subjected to concentrating step (e). In another embodiment of the present invention, the acidified aqueous soy protein solution is subjected to concentrating step (e) to produce a concentrated acidified soy protein solution having a protein concentration of about 50 to about 300 g/L.

In another embodiment of the present invention, the acidified aqueous soy protein solution is subjected to concentrating step (e) to produce a concentrated acidified soy protein solution having a protein concentration of about 100 to about 200 g/L.

In an embodiment of the present invention, the concentrating step (e) is effected by ultrafiltration using a membrane having a molecular weight cut-off of about 1,000 to about 1,000,000 daltons. In another embodiment of the present invention, the concentrating step (e) is effected by ultrafiltration using a membrane having a molecular weight cut-off of about 1,000 to about 100,000 daltons.

In an embodiment of the present invention, the acidified soy protein solution is subjected to diafiltering step (f). In an embodiment of the present invention, the diafiltration step (f) is effected using water or acidified water on the acidified aqueous soy protein solution in the absence of concentrating step (e) or before or after partial or complete concentration thereof.

In an embodiment of the present invention, the diafiltration step (f) is effected using about 1 to about 40 volumes of diafiltration solution. In another embodiment of the present invention, the diafiltration step (f) is effected using about 2 to about 25 volumes of diafiltration solution.

In an embodiment of the present invention, the diafiltration step (f) is effected until no significant further quantities of contaminants or visible colour are present in the permeate.

In an embodiment of the present invention, the diafiltration step (f) is effected until the retentate has been sufficiently purified so as to provide a soy protein isolate with a protein content of at least about 90 wt % (N×6.25) d.b.

In an embodiment of the present invention, the diafiltration step (f) is effected using a membrane having a molecular weight cut-off of about 1,000 to about 1,000,000 daltons. In another embodiment of the present invention, the diafiltration step (f) is effected using a membrane having a molecular weight cut-off of about 1,000 to about 100,000 daltons.

In an embodiment of the present invention, an antioxidant is present in the diafiltration medium during at least part of the diafiltration step (f).

In an embodiment of the present invention, the concentration step (e) and/or the diafiltration step (f) are carried out at a temperature of about 2° to about 65° C. In another embodiment of the present invention, the concentration step (e) and/or diafiltration step (f) are carried out at a temperature of about 50° to about 60° C.

In an embodiment of the present invention, the optionally partially or completely concentrated and optionally diafiltered acidified soy protein solution is subjected to a heat treatment step. In an embodiment of the present invention, the heat treatment step is effected to inactivate heat-labile anti-nutritional factors, including heat-labile trypsin inhibitors.

In an embodiment of the present invention, the heat treatment is effected at a temperature of about 70° to about 160° C. for about 10 seconds to about 60 minutes. In another embodiment of the present invention, the heat treatment is effected at a temperature of about 80° to about 120° C. for about 10 seconds to about 5 minutes. In another embodiment of the present invention, the heat treatment is effected at a temperature of about 85° C. to about 95° C. for about 30 seconds to about 5 minutes.

In an embodiment of the present invention, the heat treated soy protein solution is cooled to a temperature of about 2° to about 65° C. In another embodiment of the present invention, the heat treated soy protein solution is cooled to a temperature of about 50° to about 60° C.

In an embodiment of the present invention, the optionally concentrated and optionally diafiltered acidified protein solution is treated with an adsorbent to remove colour and/or odour compounds.

In an embodiment of the present invention, the optionally concentrated and optionally diafiltered acidified protein solution is pasteurized prior to drying.

In an embodiment of the present invention, the pasteurization step is effected at a temperature of about 55° to about 75° C. for about 15 seconds to about 60 minutes.

In an embodiment of the present invention, the optionally concentrated and optionally diafiltered acidified soy protein solution is subjected to drying step (g) to provide a soy protein isolate having a protein content of at least about 90 wt % (N×6.25) d.b. The Applicant has identified this soy protein isolate as S810.

In an embodiment of the present invention, the pH of the optionally concentrated and optionally diafiltered acidified soy protein solution is adjusted to less than about 8.0, prior to optional drying step (g). In another embodiment of the present invention, the pH of the optionally concentrated and optionally diafiltered acidified soy protein solution is adjusted to about 6.0 to about 8.0, prior to optional drying step (g). In another embodiment of the present invention, the pH of the optionally concentrated and optionally diafiltered acidified soy protein solution is adjusted to about 6.5 to about 7.5, prior to optional drying step (g).

In an embodiment of the present invention, the optional concentration and/or optional diafiltration step are operated in a manner favourable to the removal of trypsin inhibitors.

In an embodiment of the present invention, a reducing agent is present during the extraction step (a). In another embodiment of the present invention, a reducing agent is present during the optional concentration step (e) and/or the optional diafiltration step (f). In another embodiment of the present invention, a reducing agent is added to the optionally concentrated and optionally diafiltered soy protein solution prior to the drying step (g) and/or to the dried soy protein product. In an embodiment of the present invention, the reducing agent is selected from the group consisting of sodium sulfite, cysteine, N-acetylcysteine and combinations thereof. In an embodiment of the present invention, the presence of the reducing agent is intended to disrupt or rearrange the disulphide bonds of trypsin inhibitors to achieve a reduction in trypsin inhibitor activity.

Accordingly, in another aspect of the present invention, there is provided a soy protein product having a protein content of at least about 60 wt % (N×6.25) d.b. and which is prepared without a process step involving the direct addition of salt, and without a process step involving protein precipitation at a pH of about 4.0 to about 5.0 and has little or no beany flavour. In an embodiment of the present invention, production of the soy protein product does not require the use of enzymes. In another embodiment of the present invention, the soy protein product contains more than about 1.5 wt % d.b. phytic acid. In another embodiment of the present invention, the soy protein product has a protein content of at least about 90 wt % (N×6.25) d.b. In another embodiment of the present invention, the soy protein product has a low trypsin inhibitor activity.

Accordingly, in another aspect of the present invention, there is provided a food product formulated to contain the soy protein product of the present invention. In an embodiment of the present invention, the food product is a beverage.

Accordingly, in another aspect of the present invention, there is provided a soy protein product having a protein content of at least about 60 wt % (N×6.25) d.b., and a protein solubility at 1% protein w/v in water at a pH of about 2 of between about 45 and 66%, and a protein solubility at 1% protein w/v in water at a pH of about 3 of between about 35 and 65%, and a protein solubility at 1% protein w/v in water at a pH of about 4 of less than about 35%, and a protein solubility at 1% protein w/v in water at a pH of about 5 of less than 30%, and a protein solubility at 1% protein w/v in water at a pH of about 6 of between about 25 and about 55%, and a protein solubility at 1% protein w/v in water at a pH of about 7 of between about 36 and about 65%. In an embodiment of the present invention, the solubility of the soy protein product is determined by the method of Example 6.

Accordingly, in another aspect of the present invention, there is provided a soy protein product having a protein content of at least about 60 wt % (N×6.25) d.b., and a water binding capacity of greater than 3.0 ml/g, and a protein solubility at 1% protein w/v in water at a pH of about 2 and about 3 of greater than about 45%, and a protein solubility at 1% protein w/v in water at a pH of about 4 of less than about 25%, and a protein solubility at 1% protein w/v in water at a pH of about 5 of less than about 30%, and a protein solubility at 1% protein w/v in water at a pH of about 6 of less than 65%, and a protein solubility at 1% protein w/v in water at a pH of about 7 of greater than about 58%. In an embodiment of the present invention, the solubility of the soy protein product is determined by the method of Example 6. In another embodiment of the present invention the water binding capacity is determined by the method of Example 10.

Accordingly, in another aspect of the present invention, there is provided a soy protein product having a protein content of at least about 60 wt % (N×6.25) d.b., and a phytic acid content of greater than 1.5 wt %, and a protein solubility at 1% protein w/v in water at a pH of about 2 of between about 10 and about 35%, and a solubility at 1% protein w/v in water at a pH of about 3 of less than about 40%, and a protein solubility at 1% protein w/v in water at a pH of about 4 and about 5 of less than about 30%, and a protein solubility at 1% protein w/v in water at a pH of about 6 of less than about 40%, and a protein solubility at 1% protein w/v in water at a pH of about 7 of between about 15 and about 40%. In an embodiment of the present invention, the solubility of the soy protein product is determined by the method of Example 6.

Accordingly, in another aspect of the present invention, there is provided a soy protein product having a molecular weight profile comprising: about 26 to about 42% greater than about 100,000 Da, about 31 to about 52% from about 15,000 to about 100,000 Da, about 4 to about 21% from about 5,000 to about 15,000 Da, and about 3 to about 25% from about 1,000 to about 5,000 Da. In an embodiment of the present invention, the molecular weight profile comprises: about 31 to about 37% greater than about 100,000 Da, about 36 to about 47% from about 15,000 to about 100,000 Da, about 9 to about 16% from about 5,000 to about 15,000 Da, and about 8 to about 20% from about 1,000 to about 5,000 Da. In an embodiment of the present invention, the molecular weight profile of the soy protein product is determined by the method of Example 7. In an embodiment of the present invention, the soy protein product having one of the afore-mentioned molecular weight profiles has a phytic acid content greater than about 1.5 wt %.

Accordingly, in another aspect of the present invention, there is provided a soy protein product having a molecular weight profile comprising: about 22 to about 85% greater than about 100,000 Da, about 8 to about 50% from about 15,000 to about 100,000 Da, about 0 to about 23% from about 5,000 to about 15,000 Da, and about 0 to about 18% from about 1,000 to about 5,000 Da. In an embodiment of the present invention, the molecular weight profile comprises: about 27 to about 80% greater than about 100,000 Da, about 13 to about 45% from about 15,000 to about 100,000 Da, about 4 to about 18% from about 5,000 to about 15,000 Da, and about 2 to about 13% from about 1,000 to about 5,000 Da. In an embodiment of the present invention, the molecular weight profile of the soy protein product is determined by the method of Example 7. In an embodiment of the present invention, the soy protein product having one of the aforementioned molecular weight profiles has a phytic acid content greater than about 1.5 wt %. In another embodiment of the present invention, the soy protein product having one of the aforementioned molecular weight profiles has a phytic acid content greater than about 2.0 wt %.

Accordingly, in another aspect of the present invention, there is provided a soy protein product having a molecular weight profile comprising: about 4 to about 34% greater than about 100,000 Da, about 10 to about 42% from about 15,000 to about 100,000 Da, about 2 to about 22% from about 5,000 to about 15,000 Da, and about 22 to about 72% from about 1,000 to about 5,000 Da. In an embodiment of the present invention, the molecular weight profile comprises: about 9 to about 29% greater than about 100,000 Da, about 15 to about 37% from about 15,000 to about 100,000 Da, about 7 to about 17% from about 5,000 to about 15,000 Da, and about 27 to about 67% from about 1,000 to about 5,000 Da. In an embodiment of the present invention, the molecular weight profile of the soy protein product is determined by the method of Example 7. In an embodiment of the present invention, the soy protein product having one of the aforementioned molecular weight profiles has a phytic acid content greater than about 1.5 wt %. In another embodiment of the present invention, the soy protein product having one of the aforementioned molecular weight profiles has a phytic acid content greater than about 2.0 wt %.

Accordingly, in another aspect of the present invention, there is provided a soy protein product having a protein content of at least about 60 wt % (N×6.25) d.b., and a phytic acid content of greater than about 2.0 wt %, which has a L* reading for a solution prepared by dissolving sufficient protein powder to supply 0.48 g of protein in 15 ml of water, of greater than about 60, a b* reading for a solution prepared by dissolving sufficient protein powder to supply 0.48 g of protein in 15 ml of water, of less than about 26, and a protein solubility at 1% protein w/v in water at a pH of about 6 of between about 10 and about 50% In another embodiment of the present invention, the soy protein product providing solutions having the aforementioned L* and b* readings, and having the aforementioned solubility in water at a pH of about 6, has a phytic acid content greater than about 3.0%.

The soy protein products produced according to the processes of the present invention disclosed herein are suitable for use in a wide variety of conventional applications of protein products, including, but not limited to, protein fortification of processed foods and beverages and as functional ingredients in foods and beverages. Other uses of the soy protein products of the present invention are in pet foods, animal feed and in industrial and cosmetic applications and in personal care products.

GENERAL DESCRIPTION OF THE INVENTION

The initial step of the process of providing the soy protein products of the present invention involves solubilizing soy protein from a soy protein source. The soy protein source may be soybeans or any soy product or by-product derived from the processing of soybeans, including, but not limited to, soy meal, soy flakes, soy grits and soy flour. The soy protein source may be used in the full fat form, partially defatted form or fully defatted form. Where the soy protein source contains an appreciable amount of fat, an oil removal step generally is required during the process. The soy protein recovered from the soy protein source may be the protein naturally occurring in soybean or the proteinaceous material may be a protein modified by genetic manipulation but possessing characteristic hydrophobic and polar properties of the natural protein.

The soy protein products of the present invention may be prepared from soy protein source by either a batch process or a continuous process or a semi-continuous process. Protein solubilization from the soy protein source material is effected using water. The water used may be tap water or water having different levels of purity. Reverse osmosis (RO) purified water is preferred.

The pH of the extraction may be about 6 to about 11, preferably about 7.0 to about 8.5. Food grade sodium hydroxide, potassium hydroxide or any other conventional food grade alkali and combinations thereof may be added to the water to adjust the pH of the extraction as required. The solubilization of the protein is effected at a temperature of from about 1° to about 100° C., preferably about 15° to about 65° C., more preferably about 50° to about 60° C., preferably accompanied by agitation to decrease the solubilization time, which is usually about 1 to about 60 minutes. It is preferred to effect the solubilization to extract substantially as much protein from the soy protein source as is practicable, so as to provide an overall high product yield.

Extraction of the protein from the soy protein source, when conducted in a continuous operation, is carried out in any manner consistent with effecting a continuous extraction of protein from the soy protein source. In one embodiment, the soy protein source is continuously mixed with the water and the mixture is conveyed through a pipe or conduit having a length and at a flow rate for a residence time sufficient to effect the desired extraction in accordance with the parameters described herein.

The concentration of soy protein source in the water during the solubilization step may vary widely. Typical concentration values are about 5 to about 15% w/v.

The protein extraction step has the additional effect of solubilizing fats which may be present in the soy protein source, which then results in the fats being present in the aqueous phase.

The protein solution resulting from the extraction step generally has a protein concentration of about 5 to about 50 g/L, preferably about 10 to about 50 g/L.

The water of extraction may contain an antioxidant. The antioxidant may be any conventional antioxidant, such as sodium sulfite or ascorbic acid. The quantity of antioxidant employed may vary from about 0.01 to about 1 wt % of the solution, preferably about 0.05 wt %. The antioxidant may serve to inhibit oxidation of any phenolics in the protein solution.

The aqueous phase resulting from the extraction step then may be separated from the bulk of the residual soy protein source, in any conventional manner, such as by employing a decanter centrifuge. Preferably, the finer residual soy protein source material is left in the soy protein solution, but if desired, these finer solids may be removed in any conventional manner, such as by disc centrifugation and/or filtration. The separation step may be conducted at the same temperature as the extraction step or at any temperature within the range of about 1° to about 100° C., preferably about 15° to about 65° C., more preferably about 50° to about 60° C. The separated residual soy protein source material may be dried for disposal or further processed, such as to recover residual protein. Residual protein may be recovered by re-extracting the separated residual soy protein source with fresh water and the protein solution yielded upon clarification combined with the initial protein solution for further processing as described below. A counter-current extraction procedure may also be utilized. The separated residual soy protein source may alternatively be processed by any other conventional procedure to recover residual protein.

The aqueous soy protein solution may be treated with an anti-foamer, such as any suitable food-grade, non-silicone based anti-foamer, to reduce the volume of foam formed upon further processing. The quantity of anti-foamer employed is generally greater than about 0.0003% w/v. Alternatively, the anti-foamer in the quantity described may be added in the extraction steps.

The separated aqueous soy protein solution may be subject to a defatting operation, if desired or required. Defatting of the separated aqueous soy protein solution may be achieved by any conventional procedure.

The aqueous soy protein solution may be treated with an adsorbent, such as granulated activated carbon, to remove colour and/or odour compounds. Such adsorbent treatment may be carried out under any conventional conditions, generally at the ambient temperature of the separated aqueous protein solution.

The soy protein solution is then adjusted in pH to a value of about 1.5 to about 3.6, preferably about 2.0 to about 2.5 by the addition of any conventional food grade acid, such as hydrochloric acid, phosphoric acid or any other conventional food grade acid and combinations thereof. For soy proteins, isoelectric precipitation typically is performed at about pH 4.5. By adjusting the pH to lower values in the process of the present invention, a greater portion of the proteins, preferably a significant portion of the proteins, such as about 25 wt % or more, preferably about 60 wt % or more, more preferably about 80 wt % or more of the protein, is soluble in the acidified solution. The remaining protein is contained in what is termed the acid insoluble solid material, which is removed from the acidified soy protein solution by any conventional means, such as the use of a disc stack centrifuge and further processed as described below. The pH adjustment may be done at the temperature of the soy protein solution, but preferably the temperature of the soy protein solution for pH adjustment is 1° to 35° C., more preferably 15° to 35° C. as an increased proportion of the soy protein is soluble in the acidified protein solution at lower temperatures. If desired, the soy protein solution may be diluted with water prior to the acidification step described above.

If desired, the pH of the acidified protein solution may be lowered further prior to further processing. The adjusted pH of the acidified protein solution should still be in the range of about 1.5 to about 3.6, preferably about 2.0 to about 2.5.

The acidified aqueous soy protein solution may be subjected to a heat treatment to inactivate heat labile anti-nutritional factors, such as trypsin inhibitors, present in such solution as a result of extraction from the soy protein source material during the extraction step. Such a heating step also provides the additional benefit of reducing the microbial load. Generally, the protein solution is heated to a temperature of about 70° to about 160° C., preferably about 80° to about 120° C., more preferably about 85° to about 95° C., for about 10 seconds to about 60 minutes, preferably about 10 seconds to about 5 minutes, more preferably about 30 seconds to about 5 minutes. The heat treated acidified soy protein solution then may be cooled for further processing as described below, to a temperature of about 2° to about 65° C., preferably about 50° C. to about 60° C.

The resulting acidified aqueous soy protein solution may be directly dried to produce a soy protein product. In order to provide a soy protein product having a decreased impurities content, such as a soy protein isolate, the acidified aqueous soy protein solution may be processed as described below prior to drying. Further processing as described below is also believed to have a beneficial effect on the flavour of the product.

The acidified aqueous soy protein solution may be concentrated to provide a concentrated soy protein solution having a protein concentration of about 50 to about 300 g/L, preferably about 100 to about 200 g/L.

The concentration step may be effected in any conventional manner consistent with batch or continuous operation, such as by employing any conventional selective membrane technique, such as ultrafiltration or diafiltration, using membranes, such as hollow-fibre membranes or spiral-wound membranes, with a suitable molecular weight cut-off, such as about 1,000 to about 1,000,000 daltons, preferably about 1,000 to about 100,000 daltons, having regard to differing membrane materials and configurations, and, for continuous operation, dimensioned to permit the desired degree of concentration as the aqueous protein solution passes through the membranes.

As is well known, ultrafiltration and similar selective membrane techniques permit low molecular weight species to pass therethrough while preventing higher molecular weight species from so doing. The low molecular weight species include low molecular weight materials extracted from the source material, such as carbohydrates, pigments, low molecular weight proteins and anti-nutritional factors, such as trypsin inhibitors, which are themselves low molecular weight proteins. The molecular weight cut-off of the membrane is usually chosen to ensure retention of a significant proportion of the protein in the solution, while permitting contaminants to pass through having regard to the different membrane materials and configurations.

The concentrated soy protein solution then may be subjected to a diafiltration step using water. The diafiltration water is preferably at a pH equal to that of the protein solution being diafiltered. Such diafiltration may be effected using from about 1 to about 40 volumes of diafiltration solution, preferably about 2 to about 25 volumes of diafiltration solution. In the diafiltration operation, further quantities of contaminants are removed from the aqueous soy protein solution by passage through the membrane with the permeate. This purifies the aqueous protein solution and may also reduce its viscosity. The diafiltration operation may be effected until no significant further quantities of contaminants or visible colour are present in the permeate or until the retentate has been sufficiently purified so as to provide a soy protein isolate with a protein content of at least about 90 wt % (N×6.25) d.b. Such diafiltration may be effected using the same membrane as for the concentration step. However, if desired, the diafiltration step may be effected using a separate membrane with a different molecular weight cut-off, such as a membrane having a molecular weight cut-off in the range of about 1,000 to about 1,000,000 daltons, preferably about 1,000 to about 100,000 daltons, having regard to different membrane materials and configuration.

Alternatively, the diafiltration step may be applied to the acidified aqueous protein solution prior to concentration or to partially concentrated acidified aqueous protein solution. Diafiltration may also be applied at multiple points during the concentration process. When diafiltration is applied prior to concentration or to the partially concentrated solution, the resulting diafiltered solution may then be additionally concentrated. Diafiltering multiple times as the protein solution is concentrated may allow a higher final, fully concentrated protein concentration to be achieved. This reduces the volume of material to be dried.

The concentration step and the diafiltration step may be effected herein in such a manner that the soy protein product subsequently recovered contains less than about 90 wt % protein (N×6.25) d.b., such as at least about 60 wt % protein (N×6.25) d.b. By partially concentrating and/or partially diafiltering the aqueous soy protein solution, it is possible to only partially remove contaminants. This protein solution may then be dried to provide a soy protein product with lower levels of purity.

An antioxidant may be present in the diafiltration water during at least part of the diafiltration step. The antioxidant may be any conventional antioxidant, such as sodium sulfite or ascorbic acid. The quantity of antioxidant employed in the diafiltration water depends on the materials employed and may vary from about 0.01 to about 1 wt %, preferably about 0.05 wt %. The antioxidant may serve to inhibit the oxidation of any phenolics present in the soy protein solution.

The optional concentration step and the optional diafiltration step may be effected at any conventional temperature, generally about 2° to about 65° C., preferably about 50° to about 60° C., and for the period of time to effect the desired degree of concentration and diafiltration. The temperature and other conditions used to some degree depend upon the membrane equipment used to effect the membrane processing, the desired protein concentration of the solution and the efficiency of the removal of contaminants to the permeate.

As alluded to earlier, soy contains anti-nutritional trypsin inhibitors. The level of trypsin inhibitor activity in the final soy protein product can be controlled by the manipulation of various process variables.

As noted above, heat treatment of the acidified aqueous soy protein solution may be used to inactivate heat-labile trypsin inhibitors. The partially concentrated or fully concentrated acidified soy protein solution may also be heat treated to inactivate heat labile trypsin inhibitors. When the heat treatment is applied to the partially concentrated acidified soy protein solution, the resulting heat treated solution may then be additionally concentrated.

In addition, the concentration and/or diafiltration steps may be operated in a manner favourable for removal of trypsin inhibitors in the permeate along with the other contaminants. Removal of the trypsin inhibitors is promoted by using a membrane of larger pore size, such as 30,000 to 1,000,000 Da, operating the membrane at elevated temperatures, such as about 30° to about 65° C., preferably about 50° to about 60° C. and employing greater volumes of diafiltration medium, such as 10 to 40 volumes.

Acidifying and membrane processing the soy protein solution at a lower pH, such as 1.5 to 3, may reduce the trypsin inhibitor activity relative to processing the solution at higher pH, such as 3 to 3.6. When the protein solution is concentrated and/or diafiltered at the low end of the pH range, it may be desired to raise the pH of the solution prior to drying. The pH of the concentrated and/or diafiltered protein solution may be raised to the desired value, for example pH 3, by the addition of any conventional food grade alkali, such as sodium hydroxide, potassium hydroxide and combinations thereof.

Further, a reduction in trypsin inhibitor activity may be achieved by exposing soy materials to reducing agents that disrupt or rearrange the disulfide bonds of the inhibitors. Suitable reducing agents include sodium sulfite, cysteine, N-acetylcysteine, any other conventional reducing agent, and combinations thereof.

The addition of such reducing agents may be effected at various stages of the overall process. The reducing agent may be added with the soy protein source material in the extraction step, may be added to the aqueous soy protein solution following removal of residual soy protein source material, may be added to the diafiltered retentate before drying or may be dry blended with the dried soy protein product. The addition of the reducing agent may be combined with the heat treatment step and membrane processing steps, as described above.

If it is desired to retain active trypsin inhibitors in the protein solution, this can be achieved by eliminating or reducing the intensity of the heat treatment step, not utilizing reducing agents, operating the optional concentration and optional diafiltration steps at the higher end of the pH range, such as 3 to 3.6, utilizing a concentration and diafiltration membrane with a smaller pore size, operating the membrane at lower temperatures and employing fewer volumes of diafiltration medium.

The optionally concentrated and optionally diafiltered protein solution may be subject to a further defatting operation, if required. Defatting of the optionally concentrated and optionally diafiltered protein solution may be achieved by any conventional procedure.

The optionally concentrated and optionally diafiltered acidified aqueous protein solution may be treated with an adsorbent, such as granulated activated carbon, to remove colour and/or odour compounds. Such adsorbent treatment may be carried out under any conventional conditions, generally at the ambient temperature of the protein solution.

The optionally concentrated and optionally diafiltered aqueous soy protein solution may be pasteurized prior to drying or further processing. Such pasteurization may be effected under any conventional pasteurization conditions. Generally, the optionally concentrated and optionally diafiltered soy protein solution is heated to a temperature of about 55° to about 75° C. for about 15 seconds to about 60 minutes. The pasteurized soy protein solution then may be cooled, such as to a temperature of about 20° to about 35° C.

The optionally concentrated, optionally diafiltered and optionally pasteurized soy protein solution then may be dried by any conventional means such as spray drying or freeze drying to provide a soy protein product. Alternatively, the optionally concentrated, optionally diafiltered and optionally pasteurized soy protein solution may be adjusted in pH to a value of less than about 8.0, preferably about 6.0 to about 8.0, more preferably about 6.5 to about 7.5 prior to optional drying. The pH may be raised in any conventional manner such as by the addition of sodium hydroxide, potassium hydroxide or any other conventional food grade alkali solution and combinations thereof. If the protein solution is not pasteurized before pH adjustment, the pasteurization may be conducted after the pH adjustment using the conditions described above.

The soy protein product (prepared with or without the pH adjustment step prior to optional drying) has a protein content greater than about 60 wt % d.b. Preferably, the soy protein product is an isolate with a protein content in excess of about 90 wt % protein (N×6.25) d.b.

In accordance with another aspect of the present invention, the acid insoluble solid material captured after adjustment of the pH of the soy protein solution to the range of about 1.5 to about 3.6, preferably about 2.0 to about 2.5 may be optionally diluted with RO water then optionally dried to form a soy protein product having a protein content of at least about 60 wt % (N×6.25) d.b. Alternatively, the pH of the optionally diluted acid insoluble solid material may be raised to a value less than about 8.0, preferably about 6.0 to about 8.0, more preferably about 6.5 to about 7.5 by any conventional means such as by the addition of sodium hydroxide solution, potassium hydroxide or any other conventional food grade alkali solution and combinations thereof prior to optional drying to form a soy protein product having a protein content of at least about 60 wt % (N×6.25) d.b. Preferably, the acid insoluble solid material is washed in order to remove contaminants and improve the purity and flavour of the product. The acid insoluble solid material may be washed by suspending the solids in between about 1 and about 20 volumes, preferably about 1 to about 10 volumes of RO water having a pH within the range of about 1.5 to about 3.6 and preferably matching the pH of the acid insoluble solid material. The washing step may be conducted at any conventional temperature such as about 15° to about 35° C. The acid insoluble solid material is mixed with the wash solution for any conventional length of time, preferably 15 minutes or less. The washed acid insoluble solid material may then be separated from the acid wash solution by any conventional means such as by centrifugation using a disc stack centrifuge. The acid wash solution may be added to the acidified protein solution for further processing as discussed above. The washed acid insoluble solid material may be optionally diluted with RO water then optionally dried by any conventional means such as spray drying or freeze drying to provide a soy protein product having a protein content of at least about 60 wt % (N×6.25) d.b. Alternatively, the pH of the optionally diluted washed acid insoluble solid material may be adjusted to a value of less than about 8.0, preferably about 6.0 to about 8.0, more preferably about 6.5 to about 7.5 by any conventional means such as by the addition of sodium hydroxide solution, potassium hydroxide solution or any other conventional food grade alkali solution and combinations thereof, prior to optional drying. The flavour of products derived from the acid insoluble solid material may be generally higher in beany notes compared to the products prepared by processing the acid soluble protein fraction. However, the flavour of the products derived from the acid insoluble solid material is such that the products are suitable for use in food and beverage applications.

A pasteurization step may be employed on the optionally diluted acid insoluble solid material or optionally diluted washed acid insoluble solid material prior to the optional drying step. Such pasteurization may be effected under any conventional pasteurization conditions. Generally, the optionally diluted acid insoluble solid material or optionally diluted washed acid insoluble solid material is heated to a temperature of about 55° to about 75° C. for about 15 seconds to about 60 minutes. The pasteurized optionally diluted acid insoluble solid material or optionally diluted washed acid insoluble solid material then may be cooled, such as to a temperature of about 20° to about 35° C. If the optionally diluted acid insoluble solid material or optionally diluted washed acid insoluble solid material is not pasteurized before pH adjustment, the pasteurization may be conducted after the pH adjustment using the conditions described above.

Figure 1:
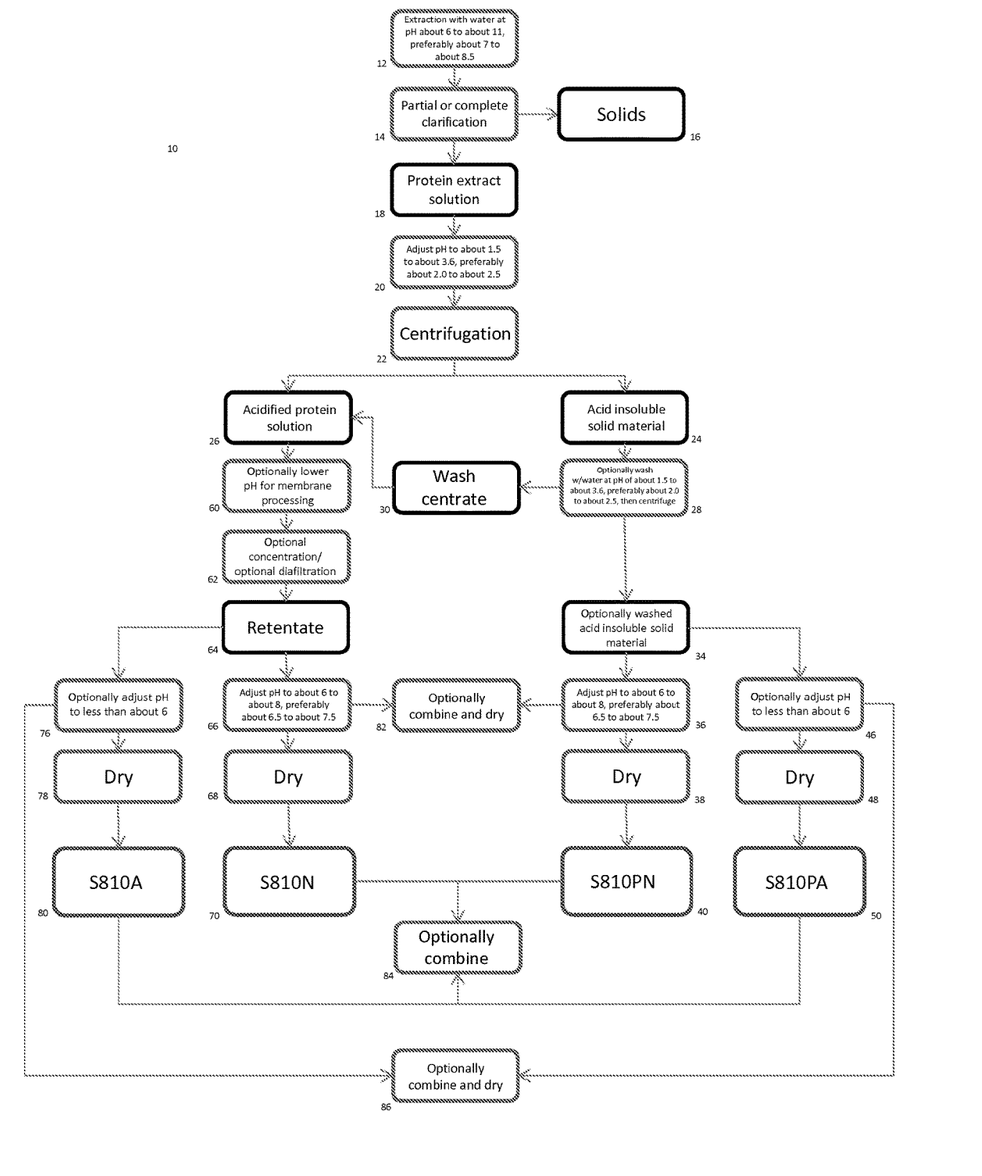
FIG. 1 is a schematic flow sheet of an embodiment of a process of the present invention.

Referring now to FIG. 1, which shows a process 10 according to one aspect of the present invention, a soy protein source is subjected to an initial extraction with water, at a pH of about 6 to about 11, preferably about 7.0 to about 8.5 at 12. The protein extract solution then is completely or partially clarified by the removal of residual soy protein source at 14, with the removed solids being collected at 16. The protein extract solution 18 then is adjusted in pH at 20 to about 1.5 to about 3.6, preferably about 2.0 to about 2.5. The acid insoluble material is removed by centrifugation at 22 yielding acid insoluble solid material at 24 and an acidified protein solution at 26.

The recovered acid insoluble solid material may be optionally washed at 28 with water having the same pH as the solids, namely about 1.5 to about 3.6, preferably about 2.0 to about 2.5, and the optionally washed solids 34 may be optionally adjusted in pH to a value less than about 6.0 at 46 then dried at 48 to provide a soy protein product designated S810PA at 50 having a protein content of at least about 60 wt % (N×6.25) d.b.

Alternatively, the optionally washed solids 34 are adjusted to a pH of generally about 6.0 to about 8.0, preferably about 6.5 to about 7.5, at 36 and dried at 38, to provide a soy protein product designated S810PN at 40 having a protein content of at least about 60 wt % (N×6.25) d.b.

The wash centrate 30 from the optional washing step 28 may be added to the acidified protein solution 26. The solution of soluble protein may be lowered in pH within the range of about 1.5 to about 3.6, preferably about 2.0 to about 2.5 at 60. The solution of soluble protein is then subjected to optional concentration and/or optional diafiltration at 62. The retentate 64 from the optional concentration and/or optional diafiltration step may be optionally adjusted in pH to a value less than about 6.0 at 76 then dried at 78 to provide a soy protein product designated S810A at 80, having a protein content of at least about 60 wt % (N×6.25) d.b. Preferably, the S810A product is an isolate having a protein content of at least about 90 wt % (N×6.25) d.b. Alternatively, the retentate 64 from the optional concentration and/or optional diafiltration step is adjusted to a pH of generally about 6.0 to about 8.0 at 66 then dried at 68 to provide a soy protein product designated S810N at 70, having a protein content of at least about 60 wt % (N×6.25) d.b. Preferably, the S810N product is an isolate having a protein content of at least about 90 wt % (N×6.25) d.b.

The S810A and S810PA protein products may be used on their own or may be combined by dry blending at 84. Alternatively, the combined 810A/810PA product may be formed by mixing the optionally washed acid insoluble solid material, optionally adjusted to a pH of less than about 6.0 at 46 with the optional concentration/optional diafiltration retentate, optionally adjusted to a pH of less than about 6.0 at 76 and drying the mixture 86. The S810N and S810PN protein products may be used on their own or may be combined by dry blending at 84. Alternatively, the combined S810N/S810PN product may be formed by mixing the optionally washed acid insoluble solid material, adjusted to a pH of about 6.0 to about 8.0, preferably about 6.5 to about 7.5 at 36 with the optional concentration/optional diafiltration retentate, adjusted to a pH of about 6.0 to about 8.0, preferably about 6.5 to about 7.5 at 66 and drying the mixture at 82.

EXAMPLES

Example 1

This Example describes the preparation of soy protein products according to one embodiment of the method of the present invention.

'a' kg of defatted soy flakes was added to 'b' L of reverse osmosis purified water along with sufficient NaOH solution (50% w/w) to adjust the pH to a target of 8.5. The mixture was agitated at ambient temperature for 30 minutes to provide an aqueous protein solution. The pH was checked and corrected to about 8.5 periodically throughout the extraction time. Coarser suspended solids were removed by centrifugation using a decanter centrifuge. 'c' g antifoam was added and then the finer solids removed using a disc stack centrifuge to produce 'd' L of protein solution having a protein content of 'e' % by weight. The pH of the protein solution was then lowered to a target pH of 'f' by the addition of HCl solution (22 BÉ HCl diluted with an equal volume of water) and the solution centrifuged using a disc stack centrifuge to provide 'g' L of acidified protein solution having pH 'h' as well as 'i' kg of acid insoluble solid material.

The acidified protein solution, having a protein content of 'j' wt %, was warmed then reduced in volume from 'k' L to 'l' L by concentration on a polyethersulfone membrane having a molecular weight cutoff of 100,000 daltons, operated at a temperature of about 'm' ° C. The concentrated protein solution, with a protein content of 'n' wt %, was diafiltered on the same membrane with 'o' L of RO water at pH 'p', with the diafiltration operation conducted at about 'q' ° C. The diafiltered protein solution, having a protein content of 'r' wt % was then further concentrated to a protein content of 's' wt %. 't' of diafiltered and concentrated protein solution was obtained and represented a yield of 'u' % of the protein in the protein solution before the acidification step. 'v' kg of diafiltered and concentrated protein solution was spray dried to yield a product found to have a protein content of 'w' % (N×6.25) d.b. The product was termed 'x' S810A. 'y' kg of diafiltered and concentrated protein solution was adjusted to 'z' using a 'aa' NaOH/KOH solution. 'ab' kg of pH adjusted solution was then diluted with 'ac' L of water and the solution, having a pH of 'ad' was spray dried to yield a product found to have a protein content of 'ae' % (N×6.25) d.b. The product was termed 'x' S810N.

The acid insoluble solid material collected from the disc stack centrifuge had a protein content of 'af' wt %. A 'ag' kg portion of these solids was mixed with 'A' L of RO water at pH 'ai' for 30 minutes at ambient temperature then run again through the disc stack centrifuge. 'aj' kg of washed acid insoluble solid material was collected having a protein content of 'ak' wt % and represented a yield of 'al' % of the protein in the protein solution before the acidification step. The washed acid insoluble solid material was then pasteurized at about 'am' ° C. for 'an' minutes. 'ao' kg of 'ap' acid insoluble solid material was spray dried to yield a product found to have a protein content of 'aq' % (N×6.25) d.b. The product was termed 'x' S810PA. 'ar' kg of 'ap' acid insoluble solid material was raised in pH to 'as' using a NaOH/KOH solution and the sample dried to yield a product found to have a protein content of 'at' % (N×6.25) d.b. The product was termed 'x' S810PN.

Parameters "a" to "at" are itemized in the following Table 1:

TABLE 1

Parameters for the production of S810 products

| x | S024-C27-14A | S024-G08-14A | S024-G14-14A |
|---|---|---|---|
| a | 60 | 30 | 30 |
| b | 600 | 300 | 300 |
| c | 0 | 0 | 2 |
| d | 420 | 235 | 232 |
| e | 3.94 | 4.02 | 3.51 |
| f | 3 | 2.5 | 3 |
| g | 380 | 205 | 220 |
| h | 2.92 | 2.65 | 2.91 |
| i | 18.24 | 23.88 | 30.22 |
| j | 3.96 | 3.51 | 2.98 |
| k | 280 | 220 | 220 |
| l | 169 | 130 | 103 |
| m | 48 | 49 | 46 |
| n | 5.50 | 5.02 | 5.22 |
| o | 845 | 260 | 206 |

TABLE 1-continued

Parameters for the production of S810 products

| x | S024-C27-14A | S024-G08-14A | S024-G14-14A |
|---|---|---|---|
| p | 3 | 2.5 | 3 |
| q | 50 | 51 | 51 |
| r | 5.20 | 4.89 | 5.00 |
| s | 10.46 | 9.83 | 9.96 |
| t | 86 L | 63.32 kg | 41.96 kg |
| u | 54.4 | 65.8 | 51.4 |
| v | 44.1 | 31.82 | 21.0 |
| w | 96.83 | 92.02 | 92.43 |
| y | 29.1 | 31.56 | 21.0 |
| z | about pH 7.3 | about pH 7.4 | pH 7.27 |
| aa | 3:1 | 1:1 | 1:1 |
| ab | 15.6 | 32.4 | 21.5 |
| ac | 15.4 | 12 | 10 |
| ad | not determined | 7.41 | 7.49 |
| ae | 93.67 | 88.15 | 88.64 |
| af | 8.75 | 5.44 | 6.43 |
| ag | not recorded | 23.88 | 30.22 |
| ah | not recorded | 47.76 | 60.44 |
| ai | about 3 | 2.5 | 3 |
| aj | 2.6 | 9.68 | 9.76 |
| ak | 6.69 | 2.72 | 5.42 |
| al | 1.0 | 2.8 | 6.5 |
| am | not applicable | about 67° C. | about 66° C. |
| an | not applicable | about 10 minutes | about 11 minutes |
| ao | not applicable | not applicable | 9.76 |
| ap | washed | washed and pasteurized | washed and pasteurized |
| aq | not applicable | not applicable | 81.46 |
| ar | not applicable | 9.58 | not applicable |
| as | not applicable | about 7.3 | not applicable |
| at | not applicable | 69.65 | not applicable |

Example 2

This Example describes the preparation of soy protein products according to one embodiment of the method of the present invention.

'a' kg of defatted soy flakes was added to 'b' L of reverse osmosis purified (RO) water and the pH adjusted to a target of 7.5 with NaOH solution (50% w/w) and HCl solution as necessary. The mixture was agitated at about 60° C. for 30 minutes to provide an aqueous protein solution. The pH was checked and corrected to about 7.5 periodically throughout the extraction time. Coarser suspended solids were removed by centrifugation using a decanter centrifuge to provide a partially clarified protein solution having a protein content of 'c' wt %, which was then cooled to about 20° C. The pH of the partially clarified protein solution was then lowered to a target pH of 2.0 by the addition of HCl solution (22 BÉ HCl diluted with an equal volume of water) and the solution centrifuged using a disc stack centrifuge to provide 'd' L of acidified protein solution having pH 'e' as well as 'f' kg of acid insoluble solid material.

The 'f' kg of acid insoluble solid material was mixed with 'g' L of RO water at pH 2 and then the sample centrifuged using a disc stack centrifuge to provide 'h' L of acidified wash solution having pH 'i' as well as 'j' kg of washed acid insoluble solid material.

'k' L of acidified protein solution was combined with the 'l' L of acidified wash solution to provide the membrane feed solution. The membrane feed solution, having a protein content of 'm' wt %, was warmed then reduced in volume from 'n' L to 'o' L by concentration on a polyethersulfone membrane having a molecular weight cutoff of 100,000 daltons, operated at a temperature of about 'p' ° C. The concentrated protein solution, with a protein content of 'q' wt %, was diafiltered on the same membrane with 'r' L of RO water at about pH 's', with the diafiltration operation conducted at about 't' ° C. The diafiltered protein solution, having a protein content of 'u' wt % was then further concentrated to a protein content of 'v' wt %. 'w' of diafiltered and concentrated protein solution was obtained and represented a yield of 'x' % of the protein in the partially clarified protein solution. 'y' of diafiltered and concentrated protein solution was diluted with L of water and the solution, having a pH of 'aa' was spray dried to yield a product found to have a protein content of 'ab' % (N×6.25) d.b. The product was termed 'ac' S810A. 'ad' of diafiltered and concentrated protein solution was adjusted to pH 'ae' using NaOH/KOH solution. The pH adjusted, diafiltered and concentrated solution was diluted with 'af' L of water and the solution, having a pH of 'ag' was spray dried to yield a product found to have a protein content of 'ah' % (N×6.25) d.b. The product was termed 'ac' S810N.

The 'j' kg of washed acid insoluble solid material was diluted with 'ai' kg of water and then pasteurized at about 'aj' ° C. for 'ak' seconds. The 'al' acid insoluble solid material collected had a protein content of 'am' wt % and represented a yield of 'an' % of the protein in the partially clarified protein solution. The 'al' acid insoluble solid material was raised in pH to 'ao' using a NaOH/KOH solution and the sample spray dried to yield a product found to have a protein content of 'ap' % (N×6.25) d.b. The product was termed 'ac' S810PN.

Parameters 'a' to 'ap' are itemized in the following Table 2:

TABLE 2

Parameters for the production of S810 products

| ac | S024-A15-15A | S024-D13-15A |
|---|---|---|
| a | 60 | 60 |
| b | 600 | 600 |
| c | 4.14 | 4.16 |
| d | 440 | 486 |
| e | 2.15 | 2.19 |
| f | 67.44 | 36.20 |
| g | 134.88 | 72.40 |
| h | 179 | 92 |
| i | 1.99 | 1.98 |
| j | 19.86 | 24.82 |
| k | 440 | not applicable |
| l | 179 | not applicable |
| m | 2.91 | not applicable |
| n | 612 | not applicable |
| o | 340 | not applicable |
| p | 49 | not applicable |
| q | 4.88 | not applicable |
| r | 1360 | not applicable |
| s | not recorded | not applicable |
| t | 51 | not applicable |
| u | 4.81 | not applicable |
| v | 8.42 | not applicable |
| w | 170 kg | not applicable |
| x | 65.8 | not applicable |
| y | 42.5 kg | not applicable |
| z | 12.5 | not applicable |
| aa | not determined | not applicable |
| ab | 95.71 | not applicable |
| ad | 42.5 kg | not applicable |
| ae | about 7.3 | not applicable |
| af | 12.5 | not applicable |
| ag | 7.24 | not applicable |
| ah | 92.10 | not applicable |
| ai | not applicable | 10.20 |
| aj | not applicable | 71 |
| ak | not applicable | 16 |
| al | washed | washed and pasteurized |
| am | 5.59 | 4.22 |

TABLE 2-continued

Parameters for the production of S810 products

| ac | S024-A15-15A | S024-D13-15A |
|---|---|---|
| an | 5.1 | 7.9 |
| ao | not applicable | 7.43 |
| ap | not applicable | 62.10 |

Example 3

This Example illustrates a procedure for effecting a further embodiment of the present invention.

'a' kg of defatted soy flakes was added to 'b' L of reverse osmosis purified (RO) water along with sufficient NaOH solution to adjust the pH to a target of 7.5. The mixture was agitated at about 60° C. for 15 minutes to provide an aqueous protein solution. The pH was checked and corrected to about 7.5 periodically throughout the extraction time.

Coarser suspended solids were removed by centrifugation using a decanter centrifuge. The resulting partially clarified solution having a protein content of 'c' wt % was diluted with 'd' L of RO water and then cooled to approximately 20° C. The pH of the protein solution was then lowered to a target of pH 2.0 by the addition of HCl solution (22BÉ) and the solution centrifuged using a disk stack centrifuge to provide 'e' L of acidified protein solution having pH of 'f'.

The acidified protein solution having a protein content of 'g' wt % was warmed then reduced in volume from 'h' L to about 'i' L by concentration on a polyethersulfone (PES) membrane, having a molecular weight cut-off of 100,000 Daltons, operated at a temperature of approximately 'j' ° C. Concurrent with the concentration step, the acidified protein solution was diafiltered with 'k' L of reverse osmosis purified water. The diafiltration efficiency was calculated at points throughout the diafiltration and concentration step. The concentrated and diafiltered protein solution was captured in batches, each having a protein concentration of about 'l' wt %. Taken together, the diafiltered and concentrated protein solution represented a yield of 'm' % of the protein in the partially clarified extract solution.

An 'n' kg aliquot of diafiltered and concentrated protein solution processed at a diafiltration efficiency of approximately 'o' X was diluted with 'p' L of RO water and spray dried to yield a product having a protein content of 'q' % (N×6.25) d.b. The product was termed 'r' 's'.

A second 't' kg aliquot of diafiltered and concentrated protein solution processed at a diafiltration efficiency of approximately 'u' X was diluted with 'v' L of reverse osmosis water and spray dried to yield a product having a protein content of 'w' % (N×6.25) d.b. The product was termed 'r' 'x'.

TABLE 3

Parameters for the production of S810 products

| r | S024-B26-15A | S024-C02-15A |
|---|---|---|
| a | 503.44 | 501.42 |
| b | 5000 | 5000 |
| c | 3.78 | 3.77 |
| d | 3208 | 3130 |
| e | 7651 | 7394 |
| f | 2.10 | 2.14 |
| g | 2.05 | 1.98 |
| h | 7321.4 | about 7326 |
| i | 897 | 1244 |

TABLE 3-continued

Parameters for the production of S810 products

| r | S024-B26-15A | S024-C02-15A |
|---|---|---|
| j | 48 | 49 |
| k | 37844.3 | 15792 |
| l | 8.8-10.4 | 8.4-10.4 |
| m | 53.0 | not available |
| n | 57.52 | 35.62 |
| o | 6.2 | 3.8 |
| p | 6.5 | 6 |
| q | 96.88 | 94.96 |
| s | S810A | S810A-01 |
| t | not applicable | 15.84 |
| u | not applicable | 3.1 |
| v | not applicable | 3 |
| w | not applicable | 96.05 |
| x | not applicable | S810A-02 |

Example 4

This Example describes the production of soy protein products according to the methods of the aforementioned U.S. Pat. Nos. 8,563,071 and 8,691,318 and U.S. patent application Ser. No. 13/879,418 filed Aug. 1, 2013 (US Patent Publication No. 2013-0316069 published Nov. 28, 2013) ("S701").

'a' kg of 'b' was combined with 'c' L of 'd' M CaCl2 solution at 'e' and agitated for 'f' minutes to provide an aqueous protein solution. The bulk of the residual solids were removed and the resulting protein solution was partially clarified by centrifugation with a decanter centrifuge. To this centrate was added 'g' g of anti-foam and then the sample was further clarified by centrifugation with a disc stack centrifuge to provide 'h' L of centrate having a protein content of 'i' % by weight. The sample was additionally clarified by filtration to provide L of protein solution having a protein content of 'k' % by weight.

'l' L of clarified protein solution was then added to 'm' L of reverse osmosis purified water and the pH of the sample lowered to 'n' with diluted HCl.

The diluted and acidified protein extract solution was reduced in volume from 'o' L to 'p' L by concentration on a polyethersulfone (PES) membrane having a molecular weight cutoff of 'q' daltons, operated at a temperature of about 'r' ° C. The acidified protein solution, with a protein content of 's' wt %, was diafiltered with 't' L of reverse osmosis purified water, with the diafiltration operation conducted at about 'u' ° C. The resulting diafiltered protein solution was then 'v'. The concentrated and diafiltered protein solution, having a protein content of 'w' % by weight, represented a yield of 'x' wt % of the initial clarified protein solution. 'y' kg of the concentrated and diafiltered protein solution was diluted with 'z' L of water then 'aa' kg of the sample dried to yield a product found to have a protein content of 'ab' % (N×6.25) d.b. The product was given designation 'ac' S701.

The parameters 'a' to 'ac' for five runs are set forth in the following Table 4:

TABLE 4

Parameters for the runs to produce S701

| ac | S005-K18-08A | S005-K24-08A | S005-L08-08A | S024-J07-13A | S024-K21-13A |
|---|---|---|---|---|---|
| a | 60 | 60 | 20 | 60 | 100 |
| b | defatted, minimally heat processed soy flour | defatted, minimally heat processed soy flour | defatted, minimally heat processed soy flour | defatted soy white flakes | defatted soy white flake |
| c | 600 | 600 | 200 | 600 | 1000 |
| d | 0.15 | 0.15 | 0.15 | 0.09 | 0.09 |
| e | ambient temperature | ambient temperature | ambient temperature | 60° C. | 60° C. |
| f | 60 | 60 | 60 | 30 | 30 |
| g | not applicable | not applicable | not applicable | not applicable | 2 |
| h | 463 | 448 | 167 | 439 | 752 |
| i | 3.59 | 3.15 | 3.16 | 2.73 | 3.26 |
| j | 410 | 360 | 170 | not applicable | not applicable |
| k | 2.63 | 2.53 | 2.03 | not applicable | not applicable |
| l | 410 | 360 | 170 | 439 | 752 |
| m | 410 | 360 | 170 | 286 | 478 |
| n | 3.07 | 3.07 | 3.06 | 3.23 | 3.09 |
| o | 820 | 720 | 340 | 717 | 1215 |
| p | 70 | 81 | 49 | 217 | 374 |
| q | 10,000 | 10,000 | 10,000 | 100,000 | 100,000 |
| r | 29 | 28 | 26 | 51 | 49 |
| s | 11.21 | 10.94 | 6.64 | 4.92 | 5.68 |
| t | 350 | 405 | 250 | 326 | 1122 |
| u | 29 | 29 | 26 | 49 | 50 |
| v | not applicable | further concentrated | further concentrated | further concentrated | further concentrated |
| w | 13.34 | 13.52 | not available | 11.68 | 10.51 |
| x | 89.6 | 91.1 | not available | 78.0 | not available |
| y | 36.21 kg | 30.68 kg | 2 kg | 80 L | 12 kg |
| z | not applicable | not applicable | not applicable | 40 L | 8 L |
| aa | 36.21 kg | 30.68 kg | not recorded | 41.32 kg | 20 kg |
| ab | 102.71 | 103.19 | 105.54 | 99.14 | 102.77 |

Example 5

This Example describes the production of soy protein products according to the methods of the aforementioned U.S. patent application Ser. No. 13/924,860 filed Jun. 24, 2013 (US Patent Publication No. 2014-0010940 published Jan. 9, 2014) ("S701N2").

'a' kg of defatted soy white flakes was combined with 'b' L of 'c' M CaCl2 solution at about 60° C. and agitated for 30 minutes to provide an aqueous protein solution. The bulk of the residual soy flakes were removed and the resulting protein solution was partially clarified by centrifugation with a decanter centrifuge to produce 'd' L of centrate having a protein content of 'e' % by weight. To this centrate was added 'f' g antifoam mixed with 'g' L of water and then the sample was further clarified by centrifugation with a disc stack centrifuge to provide 'h' L of centrate having a protein content of 'i' % by weight.

This centrate was then added to 'j' L of reverse osmosis purified water at 50° C. and the pH of the sample lowered to 'k' with HCl that had been diluted 1:1 with water.

The diluted and acidified protein extract solution was reduced in volume from 'l' L to 'm' L by concentration on a polyethersulfone (PES) membrane, having a molecular weight cutoff of 100,000 daltons, operated at a temperature of about 'n' ° C. The acidified protein solution, with a protein content of 'o' wt %, was diafiltered with 'p' L of reverse osmosis purified water, with the diafiltration operation conducted at about 'q' ° C. The resulting diafiltered protein solution was further concentrated to provide a solution with a protein content of 'r' % by weight and then diluted with water to a protein content of 's' % by weight. 't' L of the protein solution was then further diluted with L water. The pH of the protein solution was then adjusted to about 'v' with 'w' solution then 'x'. 'y' of pH adjusted solution, having a pH of 'z', protein content of 'aa' wt % and representing a yield of 'ab' wt % of the post-disc stack centrate was spray dried to yield a product found to have a protein content of 'ac' wt % (N×6.25) d.b. The product was given designation 'ad'.

The values for the parameters 'a' to 'ad' for four runs are provided in the following Table 5.

TABLE 5

Parameters for the runs to produce S701N2

| ad | S110729AS-A30-12A S701N2-01 | S024-J31-13A S701N2 | S024-K13-13A S701N2 | S024-K25-13A S701N2 |
|---|---|---|---|---|
| a | 30 | 100 | 76 | 80 |
| b | 300 | 1000 | 760 | 800 |

TABLE 5-continued

Parameters for the runs to produce S701N2

| ad | S110729AS-A30-12A S701N2-01 | S024-J31-13A S701N2 | S024-K13-13A S701N2 | S024-K25-13A S701N2 |
|---|---|---|---|---|
| c | 0.1 | 0.09 | 0.09 | 0.10 |
| d | 334.9 | not recorded | not recorded | not recorded |
| e | 3.13 | 2.99 | 2.81 | 3.09 |
| f | 6.7 | 3 | 2 | 2 |
| g | 93.3 | not applicable | not applicable | not applicable |
| h | 230 | 784 | 590 | 591 |
| i | 2.86 | 2.90 | 2.72 | 2.95 |
| j | 175 | 510 | 365 | 371 |
| k | 3.43 | 2.92 | 3.14 | 3.21 |
| l | 372 | 1280 | 945 | 962 |
| m | 103 | 380 | 260 | 275 |
| n | 47 | 51 | 52 | 50 |
| o | 5.10 | 5.26 | 5.78 | 5.65 |
| p | 515 | 570 | 780 | 825 |
| q | 50 | 51 | 51 | 51 |
| r | 12.24 | 10.75 | 11.87 | 11.00 |
| s | 6.45 | not applicable | not applicable | not applicable |
| t | 38 | not applicable | not applicable | not applicable |
| u | 38 | not applicable | not applicable | not applicable |
| v | 7.35 | 7 | 7.3 | 7.3 |
| w | NaOH | NaOH/KOH | NaOH/KOH | NaOH/KOH |
| x | not applicable | diluted with water | diluted with water | diluted with water and then the pH corrected to about 7.3 |
| y | 70 L | 50.94 kg | 90 L | 69.12 kg |
| z | 7.35 | 6.98 | 7.54 | 7.40 |
| aa | 3.14 | 3.56 | 5.50 | 4.98 |
| ab | 33.4 | 8.0 | 30.8 | 19.7 |
| ac | 101.01 | 95.51 | 97.38 | 98.39 |

Example 6

This Example illustrates the protein solubility of the soy protein products prepared without the use of salt according to the present invention as described in Examples 1 to 3, soy protein products prepared with the use of calcium salt as described in Examples 4 and 5 and the commercial soy protein isolates Pro Fam 825 and 875 (ADM, Decatur, Ill.). Solubility was tested by a modified version of the procedure of Morr et al., J. Food Sci., 50: 1715-1718.

Sufficient protein powder to supply 0.5 g of protein was weighed into a beaker and then a small amount of reverse osmosis (RO) purified water was added and the mixture stirred until a smooth paste formed. Additional water was then added to bring the volume to approximately 45 ml. The contents of the beaker were then slowly stirred for 60 minutes using a magnetic stirrer. The pH was determined immediately after dispersing the protein and was adjusted to the appropriate level (2, 3, 4, 5, 6 or 7) with diluted NaOH or HCl. The pH was measured and corrected periodically during the 60 minutes stirring. After the 60 minutes of stirring, the samples were made up to 50 ml total volume with RO water, yielding a 1% w/v protein dispersion. The protein content of the dispersions was measured by combustion analysis using a Leco Nitrogen Determinator. Aliquots of the dispersions were then centrifuged at 7,800 g for 10 minutes, which sedimented insoluble material and yielded a supernatant. The protein content of the supernatant was measured by Leco analysis and the solubility of the product calculated as follows:

Solubility (%)=(% protein in supernatant/% protein in initial dispersion)×100

Values calculated as greater than 100% were reported as 100%.

The protein solubility of the various products at different pH values is shown in Table 6.

TABLE 6

Solubility of soy protein products at different pH values

| | Solubility (%) | | | | | |
|---|---|---|---|---|---|---|
| sample | pH 2 | pH 3 | pH 4 | pH 5 | pH 6 | pH 7 |
| S024-G14-14A S810N | 58.5 | 59.6 | 29.8 | 21.6 | 45.7 | 46.8 |
| S024-A15-15A S810N | 60.6 | 43.1 | 14.7 | 11.1 | 42.4 | 54.7 |
| S024-G14-14A S810A | 59.3 | 69.5 | 20.0 | 22.3 | 42.3 | 71.2 |
| S024-A15-15A S810A | 51.9 | 52.9 | 4.6 | 0.0 | 12.5 | 63.0 |
| S024-B26-15A S810A | 93.9 | 92.5 | 13.6 | 14.0 | 35.6 | 96.1 |
| S024-G08-14A S810PN | 29.1 | 26.9 | 22.9 | 21.5 | 28.2 | 32.7 |
| S024-D13-15A S810PN | 19.4 | 10.1 | 7.0 | 7.8 | 22.1 | 22.3 |
| S024-G14-14A S810PA | 25.2 | 27.5 | 12.4 | 13.0 | 15.0 | 33.3 |
| S005-K18-08A S701 | 97.1 | 99.1 | 100 | 1.0 | 26.2 | 94.4 |
| S005-K24-08A S701 | 97.8 | 99.0 | 95.2 | 15.2 | 27.6 | 100 |
| S005-L08-08A S701 | 100 | 100 | 100 | 4.2 | 28.6 | 100 |
| S110729AS-A30-12A S701N2 | 100 | 100 | 100 | 13.7 | 9.9 | 75.9 |
| Pro Fam 825 | 66.0 | 52.7 | 44.2 | 36.3 | 58.6 | 66.4 |
| Pro Fam 875 | 59.6 | 42.9 | 29.6 | 33.0 | 57.4 | 63.5 |

As may be seen from the results presented in Table 6, all of the products of the present invention had limited solubility in the pH range of 4-5. Products derived from the acidified protein solution were more soluble than the products derived from the acid insoluble solids material at pH 2-3 and at pH 7.

Example 7

This Example illustrates the molecular weight profile of the soy protein products prepared without the use of salt according to the present invention as described in Examples 1 to 3, soy protein products prepared with the use of calcium salt as described in Examples 4 and 5 and the commercial soy protein isolates Pro Fam 825 and 875 (ADM, Decatur, Ill.).

Molecular weight profiles were determined by size exclusion chromatography using a Varian ProStar HPLC system equipped with a 300×7 8 mm Phenomenex BioSep S-2000 series column. The column contained hydrophilic bonded silica rigid support media, 5 micron diameter, with 145 Angstrom pore size.

Before the soy protein samples were analyzed, a standard curve was prepared using a Biorad protein standard (Biorad product #151-1901) containing proteins with known molecular weights between 17,000 Daltons (myoglobulin) and 670,000 Daltons (thyroglobulin) with Vitamin B12 added as a low molecular weight marker at 1,350 Daltons. A 0.9% w/v solution of the protein standard was prepared in water, filtered with a 0.45 μm pore size filter disc then a 50 μL aliquot run on the column using a mobile phase of 0.05M phosphate/0.15M NaCl, pH 6 containing 0.02% sodium azide. The mobile phase flow rate was 1 mL/min and components were detected based on absorbance at 280 nm. Based on the retention times of these molecules of known molecular weight, a regression formula was developed relating the natural log of the molecular weight to the retention time in minutes.

Retention time (min)=−0.955×ln(molecular weight)+ 18.502($r2$=0.999)

For the analysis of the soy protein samples, 0.05M NaCl, pH 3.5 containing 0.02% sodium azide was used as the mobile phase and also to dissolve dry samples. Protein samples were mixed with mobile phase solution to a concentration of 1% w/v, placed on a shaker for at least 1 hour then filtered using 0.45 μm pore size filter discs. Sample injection size was 50 μL. The mobile phase flow rate was 1 mL/minute and components were detected based on absorbance at 280 nm.

The above regression formula relating molecular weight and retention time was used to calculate retention times that corresponded to molecular weights of 100,000 Da, 15,000 Da, 5,000 Da and 1,000 Da. The HPLC ProStar system was used to calculate the peak areas lying within these retention time ranges and the percentage of protein ((range peak area/total protein peak area)×100) falling in a given molecular weight range was calculated. Note that the data was not corrected by protein response factor.

The molecular weight profiles of the products prepared as described in Examples 1-5 and the commercial products are shown in Table 8.

TABLE 7

HPLC protein profile of various products

| product | % > 100,000 Da | % 15,000- 100,000 Da | % 5,000- 15,000 Da | % 1,000- 5,000 Da |
|---|---|---|---|---|
| S024-C27-14A S810N | 36.9 | 41.7 | 10.8 | 10.6 |
| S024-G08-14A S810N | 35.2 | 46.6 | 9.3 | 8.9 |
| S024-G14-14A S810N | 34.9 | 39.0 | 10.1 | 16.0 |
| S024-A15-15A S810N | 32.8 | 39.6 | 15.8 | 11.7 |
| S024-C27-14A S810A | 79.8 | 13.9 | 4.3 | 2.0 |
| S024-G08-14A S810A | 63.2 | 23.8 | 8.2 | 4.8 |
| S024-G14-14A S810A | 74.1 | 17.7 | 4.9 | 3.4 |
| S024-A15-15A S810A | 27.4 | 44.1 | 17.9 | 10.6 |
| S024-B26-15A S810A | 56.9 | 24.5 | 12.2 | 6.4 |
| S024-C02-15A S810A-01 | 61.0 | 21.3 | 10.8 | 6.9 |
| S024-G08-14A S810PN | 16.3 | 36.5 | 14.4 | 32.7 |
| S024-D13-15A S810PN | 10.0 | 15.3 | 7.7 | 67.0 |
| S024-G14-14A S810PA | 28.6 | 27.6 | 16.0 | 27.8 |
| S005-K18-08A S701 | 74.5 | 16.5 | 5.2 | 3.9 |
| S005-K24-08A S701 | 68.9 | 18.1 | 6.9 | 6.2 |
| S024-J07-13A S701 | 88.1 | 9.1 | 0.4 | 2.4 |
| S024-K21-13A S701 | 92.0 | 6.4 | 0.8 | 0.8 |
| S110729AS-A30-12A S701N2-01 | 36.5 | 40.9 | 9.8 | 12.7 |
| S024-J31-13A S701N2 | 27.7 | 33.8 | 10.4 | 28.0 |
| S024-K13-13A S701N2 | 36.4 | 39.3 | 10.2 | 14.1 |
| S024-K25-13A S701N2 | 40.0 | 39.0 | 7.0 | 14.1 |
| Pro Fam 825 | 3.2 | 30.2 | 32.5 | 34.1 |
| Pro Fam 875 | 0.5 | 19.6 | 33.7 | 46.2 |

As may be seen from the results shown in Table 7, the products of the present invention had molecular weight profiles that were different from the commercial products tested.

Example 8

This Example contains an evaluation of the phytic acid content of the soy protein products prepared without the use of salt according to the present invention as described in Examples 1 to 3, soy protein products prepared with the use of calcium salt as described in Examples 4 and 5 and the commercial soy protein isolates Pro Fam 825 and 875 (ADM, Decatur, Ill.). Phytic acid content was determined using the method of Latta and Eskin (J. Agric. Food Chem., 28: 1313-1315).

The results obtained are set forth in the following Table 8.

TABLE 8

Phytic acid content of various products

| sample | % phytic acid |
|---|---|
| S024-C27-14A S810N | 2.67 |
| S024-G08-14A S810N | 2.88 |
| S024-G14-14A S810N | 2.64 |
| S024-A15-15A S810N | 3.35 |
| S024-C27-14A S810A | 3.06 |
| S024-G08-14A S810A | 3.15 |
| S024-G14-14A S810A | 3.05 |
| S024-A15-15A S810A | 3.21 |
| S024-B26-15A S810A | 4.20 |
| S024-C02-15A S810A-01 | 4.27 |
| S024-C02-15A S810A-02 | 4.19 |
| S024-G08-14A S810PN | 2.74 |
| S024-D13-15A S810PN | 2.19 |
| S024-G14-14A S810PA | 3.20 |
| SO05-K18-08A S701 | 0.00 |
| SO05-K24-08A S701 | 0.02 |
| S005-L08-08A S701 | 0.00 |
| S024-K21-13A S701 | 0.00 |
| S110729AS-A30-12A S701N2-01 | 0.29 |
| S024-J31-13A S701N2 | 0.00 |
| S024-K13-13A S701N2 | 0.08 |
| S024-K25-13A S701N2 | 0.00 |
| Pro Fam 825 | 1.86 |
| Pro Fam 875 | 1.64 |

As may be seen from the results presented in Table 8, the phytic acid content of all of the products of the present invention was notably higher than the phytic acid content of the products prepared with calcium salt and also higher than the phytic acid content of the commercial products.

Example 9

This Example contains an evaluation of the colour in solution and the haze level of solutions of the soy protein products prepared without the use of salt according to the present invention as described in Examples 1 to 3, the soy protein products prepared with the use of calcium salt as described in Examples 4 and 5 and the commercial soy protein isolates Pro Fam 825 and 875 (ADM, Decatur, Ill.). Solutions of the protein products were prepared by dissolving sufficient protein powder to supply 0.48 g of protein in 15 ml of RO water. The pH of the solutions was measured with a pH meter and the colour and haze level assessed using a HunterLab ColorQuest XE instrument operated in transmission mode. The results are shown in the following Table 9.

TABLE 9

Colour and haze values for samples in solution

| product | pH | L* | a* | b* | % haze |
|---|---|---|---|---|---|
| S024-C27-14A S810N | 6.79 | 63.25 | 2.57 | 23.67 | 98.3 |
| S024-G08-14A S810N | 6.96 | 64.67 | 1.04 | 21.66 | 97.2 |
| S024-G14-14A S810N | 6.64 | 67.00 | 2.84 | 24.04 | 96.6 |
| S024-A15-15A S810N | 6.38 | 68.18 | 3.37 | 22.54 | 95.4 |
| S024-C27-14A S810A | 3.19 | 67.86 | 3.36 | 23.74 | 91.9 |
| S024-G08-14A S810A | 2.70 | 76.97 | 2.68 | 24.51 | 76.4 |
| S024-G14-14A S810A | 2.88 | 73.62 | 2.97 | 23.98 | 77.6 |
| S024-A15-15A S810A | 2.84 | 71.92 | 3.44 | 21.36 | 95.0 |
| S024-B26-15A S810A | 3.03 | 75.73 | 2.74 | 24.64 | 93.5 |
| S024-C02-15A S810A-01 | 3.03 | 79.45 | 2.37 | 25.42 | 90.7 |
| S024-C02-15A S810A-02 | 2.94 | 81.56 | 1.96 | 24.80 | 88.8 |
| S024-G08-14A S810PN | 7.25 | 49.79 | 1.93 | 32.67 | 98.6 |
| S024-D13-15A S810PN | 7.44 | 33.34 | 13.97 | 40.96 | 97.4 |
| S024-G14-14A S810PA | 3.20 | 52.40 | 1.81 | 29.67 | 96.6 |
| S024-J07-13A S701 | 3.70 | 96.16 | −0.64 | 8.35 | 9.5 |
| S024-K21-13A S701 | 3.20 | 97.95 | −0.74 | 6.40 | 6.0 |
| S110729AS-A30-12A S701N2-01 | 7.32 | 93.38 | −0.11 | 12.79 | 40.4 |
| S024-K13-13A S701N2 | 7.47 | 72.36 | 0.41 | 18.33 | 98.5 |
| S024-K25-13A S701N2 | 7.16 | 64.15 | 1.16 | 16.82 | 98.0 |
| Pro Fam 825 | 6.80 | 41.98 | 3.19 | 25.42 | 97.4 |
| Pro Fam 875 | 7.12 | 46.10 | 3.99 | 27.56 | 97.5 |

As may be seen from the results in Table 9, the L* values determined for the solutions of the products derived from the acidified protein solution of the present invention were lighter than the solutions of the commercial soy protein isolates.

Example 10

This Example contains an evaluation of the water binding capacity of the soy protein products prepared according to the present invention without the use of salt as described in Examples 1 to 3 and the commercial soy protein isolates Pro Fam 825 and 875 (ADM, Decatur, Ill.).

The water binding capacity of the products was determined by the following procedure. Protein powder (1 g) was weighed into centrifuge tubes (50 ml) of known weight. To this powder was added approximately 20 ml of reverse osmosis purified (RO) water at the natural pH. The contents of the tubes were mixed using a vortex mixer at moderate speed for 1 minute. The samples were incubated at room temperature for 4 minutes then mixed with the vortex for 30 seconds. This was followed by incubation at room temperature for 4.5 minutes then another 30 seconds of vortex mixing. The samples were then centrifuged at 1,000 g for 15 minutes at 20° C. After centrifugation the supernatant was carefully removed, ensuring that all solid material remained in the tube. The centrifuge tube was then re-weighed and the weight of water saturated sample was determined.

Water binding capacity (WBC) was calculated as:

WBC (ml/g)=(mass of water saturated sample−mass of initial sample)/(mass of initial sample×total solids content of sample)

The results are shown in Table 10.

TABLE 10

Water binding capacity of protein products

| Product | WBC (ml/g) |
|---|---|
| S024-G14-14A S810N | 5.37 |
| S024-A15-15A S810N | 7.47 |
| S024-G14-14A S810A | 5.60 |
| S024-A15-15A S810A | 8.63 |
| S024-B26-15A S810A | 4.02 |
| S024-G08-14A S810PN | 4.02 |
| S024-D13-15A S810PN | 5.47 |
| S024-G14-14A S810PA | 3.91 |
| Pro Fam 825 | 1.87 |
| Pro Fam 875 | 3.18 |

As may be seen from the results presented in Table 10, the products of the present invention had higher water binding capacities than the commercial products evaluated.

Example 11

This Example is another illustration of the molecular weight profile of the soy protein products prepared without the use of salt according to the present invention as described in Examples 1 to 3, soy protein products prepared with the use of calcium salt as described in Examples 4 and 5 and the commercial soy protein isolates Pro Fam 825 and 875 (ADM, Decatur, Ill.).

Molecular weight profiles were determined by size exclusion chromatography using a Varian ProStar HPLC system equipped with a 300×7 8 mm Phenomenex BioSep S-2000 series column. The column contained hydrophilic bonded silica rigid support media, 5 micron diameter, with 145 Angstrom pore size.

Before the soy protein samples were analyzed, a standard curve was prepared using a Biorad protein standard (Biorad product #151-1901) containing proteins with known molecular weights between 17,000 Daltons (myoglobulin) and 670,000 Daltons (thyroglobulin) with Vitamin B12 added as a low molecular weight marker at 1,350 Daltons. A 0.9% w/v solution of the protein standard was prepared in water, filtered with a 0.45 μm pore size filter disc then a 50 μL aliquot run on the column using a mobile phase of 0.05M phosphate/0.15M NaCl, pH 6 containing 0.02% sodium azide. The mobile phase flow rate was 1 mL/min and components were detected based on absorbance at 280 nm. Based on the retention times of these molecules of known molecular weight, a regression formula was developed relating the natural log of the molecular weight to the retention time in minutes.

Retention time (min)=−0.865×ln(molecular weight)+17.154($r2$=0.98)

For the analysis of the soy protein samples, 0.05M phosphate/0.15M NaCl, pH 6 containing 0.02% sodium azide was used as the mobile phase and also to dissolve dry samples. Protein samples were mixed with mobile phase solution to a concentration of 1% w/v, placed on a shaker for at least 1 hour then filtered using 0.45 μm pore size filter discs. Sample injection size was 50 μL. The mobile phase flow rate was 1 mL/minute and components were detected based on absorbance at 280 nm.

The above regression formula relating molecular weight and retention time was used to calculate retention times that corresponded to molecular weights of 100,000 Da, 15,000 Da, 5,000 Da and 1,000 Da. The HPLC ProStar system was used to calculate the peak areas lying within these retention time ranges and the percentage of protein ((range peak area/total protein peak area)×100) falling in a given molecular weight range was calculated. Note that the data was not corrected by protein response factor.

The molecular weight profiles of the products prepared as described in Examples 1-5 and the commercial products are shown in Table 11.

TABLE 11

HPLC protein profile of various products

| product | % > 100,000 Da | % 15,000-100,000 Da | % 5,000-15,000 Da | % 1,000-5,000 Da |
|---|---|---|---|---|
| S024-C27-14A S810N | 29.9 | 31.5 | 14.2 | 24.4 |
| S024-G08-14A S810N | 16.0 | 33.4 | 20.8 | 29.8 |
| S024-G14-14A S810N | 28.3 | 26.6 | 15.0 | 30.2 |
| S024-A15-15A S810N | 22.7 | 33.7 | 22.2 | 21.5 |
| S024-C27-14A S810A | 26.8 | 26.9 | 13.1 | 33.2 |
| S024-G08-14A S810A | 17.7 | 36.8 | 16.4 | 29.1 |
| S024-G14-14A S810A | 24.1 | 32.7 | 15.2 | 28.0 |
| S024-A15-15A S810A | 7.9 | 28.3 | 32.1 | 31.6 |
| S024-B26-15A S810A | 11.7 | 33.6 | 30.4 | 24.3 |
| S024-C02-15A S810A-01 | 14.5 | 30.9 | 28.2 | 26.4 |
| S024-G08-14A S810PN | 24.5 | 44.5 | 11.8 | 19.2 |
| S024-D13-15A S810PN | 8.2 | 36.8 | 30.8 | 24.1 |
| S024-G14-14A S810PA | 6.7 | 32.0 | 18.2 | 43.0 |
| S005-K18-08A S701 | 44.4 | 31.3 | 10.1 | 14.1 |
| S005-K24-08A S701 | 42.1 | 31.0 | 11.2 | 15.8 |
| S110729AS-A30-12A S701N2-01 | 40.7 | 26.1 | 7.4 | 25.8 |
| S024-J31-13A S701N2 | 24.4 | 27.6 | 8.5 | 39.5 |
| S024-K13-13A S701N2 | 19.8 | 29.7 | 8.3 | 42.3 |
| S024-K25-13A S701N2 | 23.0 | 31.6 | 6.1 | 39.3 |
| Pro Fam 825 | 36.2 | 30.8 | 17.3 | 15.6 |
| Pro Fam 875 | 26.3 | 30.1 | 21.5 | 22.0 |

As may be seen from the results shown in Table 11, products of the present invention had molecular weight profiles that were different from the commercial products tested.

SUMMARY OF THE DISCLOSURE

In summary of this disclosure, there are provided novel and inventive soy protein products of enhanced taste and novel and inventive methods of producing soy protein products of enhanced taste, which methods do not involve the direct addition and use of calcium salts or other salts for extraction of the soy protein from the soy protein source or in any other process step. Modifications are possible within the scope of this invention.

What we claim is:

1. A soy protein product having a protein content of at least about 60 wt % (N×6.25) d.b., and a protein solubility at 1% protein w/v in water at a pH of about 2 of between about 45 and about 65%, and a solubility at 1% protein w/v in water at a pH of about 3 of between about 41 and about 65%, and a protein solubility at 1% protein w/v in water at a pH of about 4 of less than about 35%, and a protein solubility at 1% protein w/v in water at a pH of about 5 of less than about 27%, and a protein solubility at 1% protein w/v in water at a pH of about 6 of between about 31% and about 55%, and a protein solubility at 1% protein w/v in water at a pH of about 7 of between about 36% and about 65%.

2. A soy protein product having a protein content of at least about 60 wt % (N×6.25) d.b., and a phytic acid content of greater than 2.0 wt % d.b., and a protein solubility at 1% protein w/v in water at a pH of about 2 of between about 10 and about 35%, and a solubility at 1% protein w/v in water at a pH of about 3 of less than about 40%, and a protein solubility at 1% protein w/v in water at a pH of about 4 and about 5 of less than about 30%, and a protein solubility at 1% protein w/v in water at a pH of about 6 of less than about 40%, and a protein solubility at 1% protein w/v in water at a pH of about 7 of between about 20 and about 40%.

3. A soy protein product having a protein content of at least about 60 wt % (N×6.25) d.b., and a phytic acid content selected from the group consisting of greater than about 2.0 wt % d.b. and greater than about 3.0 wt % d.b., which has a L* reading for a solution prepared by dissolving sufficient protein powder to supply 0.48 g of protein in 15 ml of water, of greater than about 60, a b* reading for a solution prepared by dissolving sufficient protein powder to supply 0.48 g of protein in 15 ml of water of less than about 26, and which has a protein solubility at 1% protein w/v in water at a pH of about 6 of between about 30 and about 50%, and a protein solubility at 1% protein w/v in water at a pH of about 2 of between about 40 and about 70%.

4. A soy protein product having a protein content of at least about 60 wt % (N×6.25) d.b., and a phytic acid content of greater than about 2.0 wt % d.b., which has a natural pH in aqueous solution of less than about 3.6 and has a L* reading for a solution prepared by dissolving sufficient protein powder to supply 0.48 g of protein in 15 ml of water of less than about 90, and a protein solubility at 1% protein w/v in water at a pH of about 2 and about 3 of greater than about 45%, and a protein solubility at 1% protein w/v in water at a pH of about 4 of less than about 25%, and a protein solubility at 1% protein w/v in water at a pH of about 5 of less than about 30%, and a protein solubility at 1% protein w/v in water at a pH of about 6 of between about 12 and about 65%, and a protein solubility at 1% protein w/v in water at a pH of about 7 of greater than about 58%.

* * * * *